United States Patent [19]
Verdun

[11] Patent Number: 5,805,833
[45] Date of Patent: Sep. 8, 1998

[54] METHOD AND APPARATUS FOR REPLICATING PERIPHERAL DEVICE PORTS IN AN EXPANSION UNIT

[75] Inventor: Gary J. Verdun, Belton, Tex.

[73] Assignee: Texas Instruments Incorporated, Dallas, Tex.

[21] Appl. No.: 587,163

[22] Filed: Jan. 16, 1996

[51] Int. Cl.⁶ .................................................. G06F 13/00
[52] U.S. Cl. ........................ 395/281; 395/822; 395/831
[58] Field of Search ..................................... 395/281, 822, 395/831, 282, 283

[56] References Cited

U.S. PATENT DOCUMENTS

| | | | |
|---|---|---|---|
| 5,555,491 | 9/1996 | Tao | 361/686 |
| 5,569,052 | 10/1996 | Belt et al. | 439/638 |
| 5,586,308 | 12/1996 | Hawkins et al. | 395/550 |

*Primary Examiner*—Ayaz R. Sheikh
*Assistant Examiner*—Ario Etienne
*Attorney, Agent, or Firm*—Ronald O. Neerings; James C. Kesterson; Richard L. Donaldson

[57] ABSTRACT

A device for replicating input/output protocols (265, 290, 310, 340, 360) in an expansion unit configuration (20, 60) implemented in a semiconductor chip (85) that supports a the protocols including one or more pass-through signal pathways (265), at least one serial protocol (310), at least one parallel logic protocol (340), and a peripheral component interface target device protocol (290). The device (85) may also support a dedicated data bus protocol (360) such as an 8-bit or 16-bit port and provides an interface pathway between various types of expansion units (20, 60) and a portable computer system (15) using the peripheral component interface bus (22) on the portable computer (15) as an interface between the system processor (17) and stand-alone peripheral devices (35, 110, 115, 117, 120, 125).

19 Claims, 3 Drawing Sheets

METHOD AND APPARATUS FOR REPLICATING PERIPHERAL DEVICE PORTS IN AN EXPANSION UNIT

TECHNICAL FIELD

The present invention relates in general to a method and device for connecting peripherals to a portable computer system and in particular to such a device that replicates input/output peripheral communication standards using the peripheral component interface bus architecture.

BACKGROUND OF THE INVENTION

Without limiting the scope of the invention, its background is described in connection with a portable computer system coupled to an expansion base option for operably linking one or more external peripheral devices to the portable computer system.

The increased demand for portable computer systems, such as laptop and notebook computers, has resulted in a proliferation of peripheral devices and external options designed to increase the functionality and convenience of the portable computer. One such option is commonly referred to as the expansion base or "docking" unit. In essence, a portable computer system is coupled ("docked") to an expansion base via a physical connector. The expansion base, in turn, houses one or more peripheral device such as a hard disk, sound card, video card and the like, which are communicably linked to the portable computer's microprocessor and other subsystems. In this way, a notebook computer user can have both the functionality of a desktop computer and the portability of a notebook system.

A second type of expansion base unit, called the expansion option, has also emerged. Rather than housing the peripherals, the expansion option provides a convenient way for a user to connect stand-alone peripherals, such as modems, printers, monitors, pointing devices and the like to the portable computer via a single expansion connector. The stand-alones are attached to individual ports of the expansion option with the portable computer connected to a single expansion option connector permitting communications between the computer and the peripherals. Thus, the expansion option eliminates the need to connect and disconnect individual peripherals to the portable system each time the portable computer system is moved.

Most expansion technology has been implemented using a dedicated Input/Output (I/O) expansion bus between the portable computer system and the expansion unit. For example, a dedicated integrated circuit chip-based solution known as the Super I/O is available on the market today. Essentially, a bridge is formed between the I/O slots on the portable system board and the external peripheral devices by adding an interface controller, signal paths and other logic to the personal computer motherboard.

Such chip-based solutions present several disadvantages when used in portable computer systems. For example, critical Printed Circuit Board ("PCB") surface area is consumed with the additional circuitry and logic needed to implement the interface protocols to each peripheral device. Also, the additional power used by the added circuitry places an unnecessary burden on the available system power resources. The need to conserve power and reduce PCB surface area requirements are important considerations in the design of modern portable computer systems.

In addition, a recent development in the portable computer industry is the adoption of the Peripheral Component Interface (PCI). The PCI bus is a synchronous, processor-independent 32-bit or 64-bit local bus that offers several key advantages over older bus structures such ISA and EISA. Compared to older architectures, PCI permits higher bus speeds (up to 33 Mhz), increased data transfer rates and independence from a particular processor or local bus arrangement.

Furthermore, PCI requires less printed circuit board (PCB) area compared to other bus implementations due to its relatively small pin count (49 pins for a Master PCI and 47 pins for a PCI target). Thus, it is common for computer manufacturers to offer one or more PCI slots on their desktop computers along side one or more ISA, EISA slots or other standard interface.

SUMMARY OF THE INVENTION

The use of PCI on portable computers makes prior expansion base solutions less practical given the size and power constraints of portable computer systems. What is needed is an expansion unit connector that permits use of an existing PCI slot on the portable system board to drive devices in an expansion base configuration while at the same time providing the convenience of an expansion option to drive stand-alone devices in an expansion option configuration. Until the present invention there were no known PCI based expansion bus connectors that took advantage of the PCI bus architecture to interface with peripherals in both expansion base and expansion option configurations. Accordingly, it is one object of the present invention to provide an interface between the portable computer system and the peripheral devices that minimizes pin count and PCB real estate requirements by using an existing PCI bus to communicate with devices on the expansion unit.

Another object of the present invention is to provide an interface with no additional PCB requirements on the portable system motherboard. The replicator is maintained on the expansion option board and connected to a physical connector leading to the portable computer. The replicator bridges the portable system to stand-alone devices which are connected to the expansion unit via dedicated pin arrangements.

Still another object of the present invention is to provide an interface capable of implementing standard serial, parallel, PCI and other communications handshake protocols between the portable system processor and devices connected to an expansion option via a PCI bus on the portable computer system. A predetermined number of signal pins allocated to one or more serial ports, one or more parallel ports, several pass through lines and other system interface lines are used to bridge the system to the peripherals. All interrupt, address and data frames received from the system are carried from the PCI bus through the expansion connector and decoded by the replicator on the expansion unit side.

Disclosed is a device arranged in a semiconductor chip that replicates input/output protocols by providing a plurality of signals pathways from the portable computer system unit to one or more expansion options. The device supports a plurality of pass-through signal pathways, at least one serial protocol port, at least one parallel protocol port and a PCI target device port. The device is configured as an agent on a standard expansion base connector and limits the PCB real estate and pin count requirements associated with implementing PCI on a portable computer system.

For a more complete understanding of the present invention, including its features and advantages, reference is now made to the following detailed description, taken in conjunction with the accompanying drawings.

DETAILED DESCRIPTION OF THE PREFERRED EMBODIMENT

Figure 1:
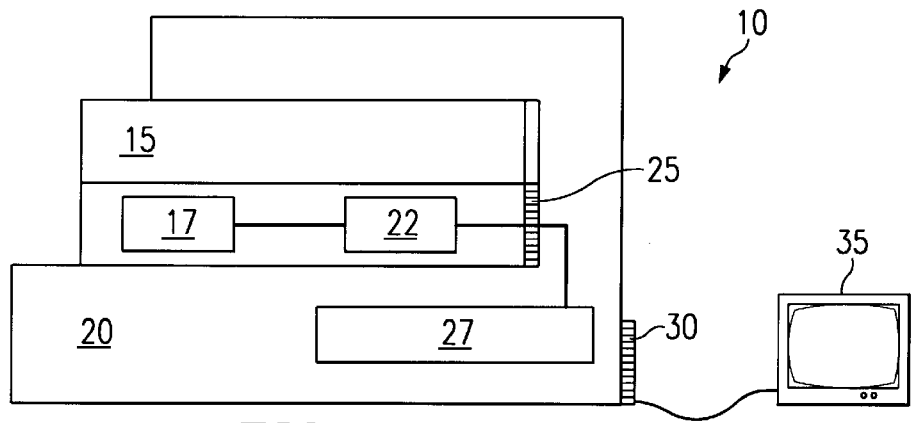
FIG. 1 is a prior art sketch diagram of a portable computer coupled to an expansion base unit.

In reference to FIG. 1, an expansion base configuration 10 of a portable computer system 15 coupled to an expansion base unit 20 is shown. Expansion base unit 20 illustrates one of the available docking stations on the market today having one or more expansion slots for holding one or more peripheral devices 27 such as a hard disk drive, sound card, display terminal, CD drive and other peripheral devices.

As shown, an expansion base connector 25 is used to communicably link the portable computer system 15 to the expansion base unit 20 permitting communications between portable computer 15 and peripheral device 27 along PCI bus 22. For example, system processor 17 could communicate with target PCI device 27 via PCI bus 22. The system request, address, data and other signals pass along expansion base connector 25 via pin type conductors or may be canter levered beam type contacts.

Likewise, a stand-alone peripheral may include a display terminal 35 which is communicably linked to portable computer system 15 via port 30 of expansion base 20. The PCI bus 22 provides an interface to PCI compliant devices 27 and stand-alone devices 35 to processor 17 in portable computer system 15 via a dedicated host bridge and local bus within the system 15.

Figure 2:
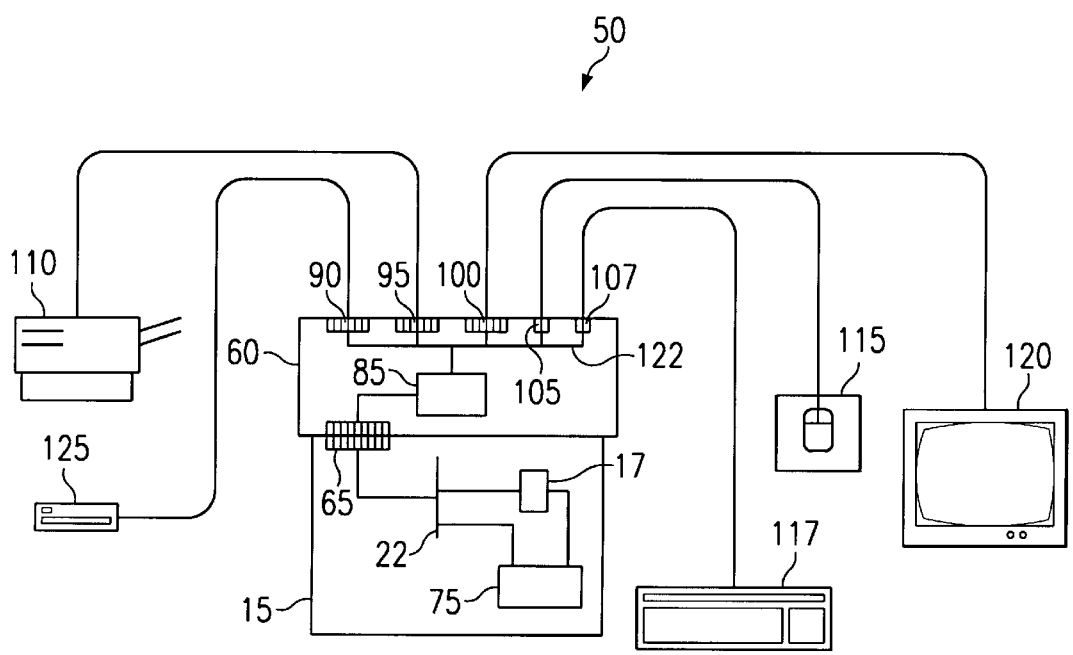
FIG. 2 is a sketch diagram of a portable computer couple to expansion option with stand-alone devices in accordance with the preferred embodiment of the invention.

Turning now to FIG. 2, an expansion option configuration 50 of the portable computer system 15 coupled to an expansion option 60 is shown. An expansion option connector 65 provides the physical level interface to expansion option 60.

In some embodiments, expansion option connector 65 is identical to expansion base connector 25 permitting the use of the portable computer system 15 with both expansion bases and expansion options via a single connector. In other embodiments, the expansion option connector 65 is dedicated solely for expansion option use with a separate dedicated expansion base connector 25.

The expansion option connector 65 contains all the physical circuit paths for carrying communications signals between portable computer system 15 and expansion option 60. In the preferred embodiment, a plurality of pins having uniform ohmic and capacitive characteristics are used and form a male end of the expansion option connector 65. A female end receives the pins completing the connection between the portable 15 and the option 60.

Also shown are stand-alone peripherals such as pointing device (serial mouse) 115, display means (video terminal) 120, printing means (parallel or serial printer) 110 and drive (CD disk drive, backup drive, micro diskette drive and others) 125. It should be understood that peripherals 110, 115, 120 and 125 are representative of the number and types of stand-alone peripherals which may be employed and used with expansion option 60 and portable computer 15.

Device ports 90, 95, 100 and 105 provide the physical level interfaces to peripherals 110, 125, 120 and 105, respectively. Device ports 90, 95, 100 and 105 are configured to implement known communications protocols. For example, a parallel printing device 110 may require a high-speed parallel-bus port 90 interface (IEEE 488-1975, IEEE 1284 or standard parallel printer port as examples) for implementing a standard parallel handshake protocol between portable 15 and peripheral 110.

Other handshake protocols permitting communications between a processing unit and peripherals may be employed using standard interrupt and programmed I/O interfaces. Still other protocols included the Peripheral Component Interface (PCI) bus standard which uses 49 pins for a Master PCI device and 47 pins for a PCI target device. A nonstandard dedicated data port may be employed permitting communications via a manufacturer defined protocol.

FIG. 2 also shows that a keyboard 117 may be interfaced to the expansion option 60 via a pass-through connector 107. Likewise, a pass-through connector 105 is used to connect pointing device 115, which may be a serial mouse, pen or other similar apparatus, to the expansion option 60. Pass-through connectors 105 and 107 act as signal conduits between devices 115 and 117, respectively, and portable computer 15. In the preferred embodiment, pins are used to form dedicated signal paths in the expansion option connector 65 between devices 115, 117 and PCI bus 22 permitting processor 17 communications with devices 115 and 117.

Also shown is display means 120 communicably linked with portable computer 15 and video display card 75 in portable computer 15 via expansion connector 65. Video signals from video controller 75 and display means 120 pass through dedicated pins of expansion connector 65.

A port replicator 85 is a critical element of the present invention providing the physical level interface to standard I/O devices 110, 125, 120, 117 and 115 through device ports 90, 95, 100, 105 and 107, respectively. In the preferred embodiment, port replicator 85 is implemented on a single semiconductor chip for all devices 110, 125, 120, 117 and 115. Also, in the preferred embodiment, the connector 65 contains at least 120 pins providing support for standard I/O devices including one parallel, one serial, one PCI target device, an 8 or 16-bit data port, mouse, keyboard interface and miscellaneous system signals such as power and ground. It should be understood that other device configurations and I/O types may be employed and used.

In the preferred embodiment, port replicator 85 is maintained inside expansion option 60 eliminating the need for a dedicated I/O interface signals on the portable computer 15 system board and expansion connector. Port replicator 85 acts as an agent on the expansion PCI bus 22 and a system signal conduit from portable computer 15 subsystems to peripheral devices such as 110, 125, 120, 117 and 115. In this way, expansion connector 65 may be used with other expansion units such as a desk-based expansion base 20. While port replicator 85 may be maintained on the portable computer 15 system side, it should be understood that such an implementation would require additional PCB real estate and increase component count.

Figure 3:
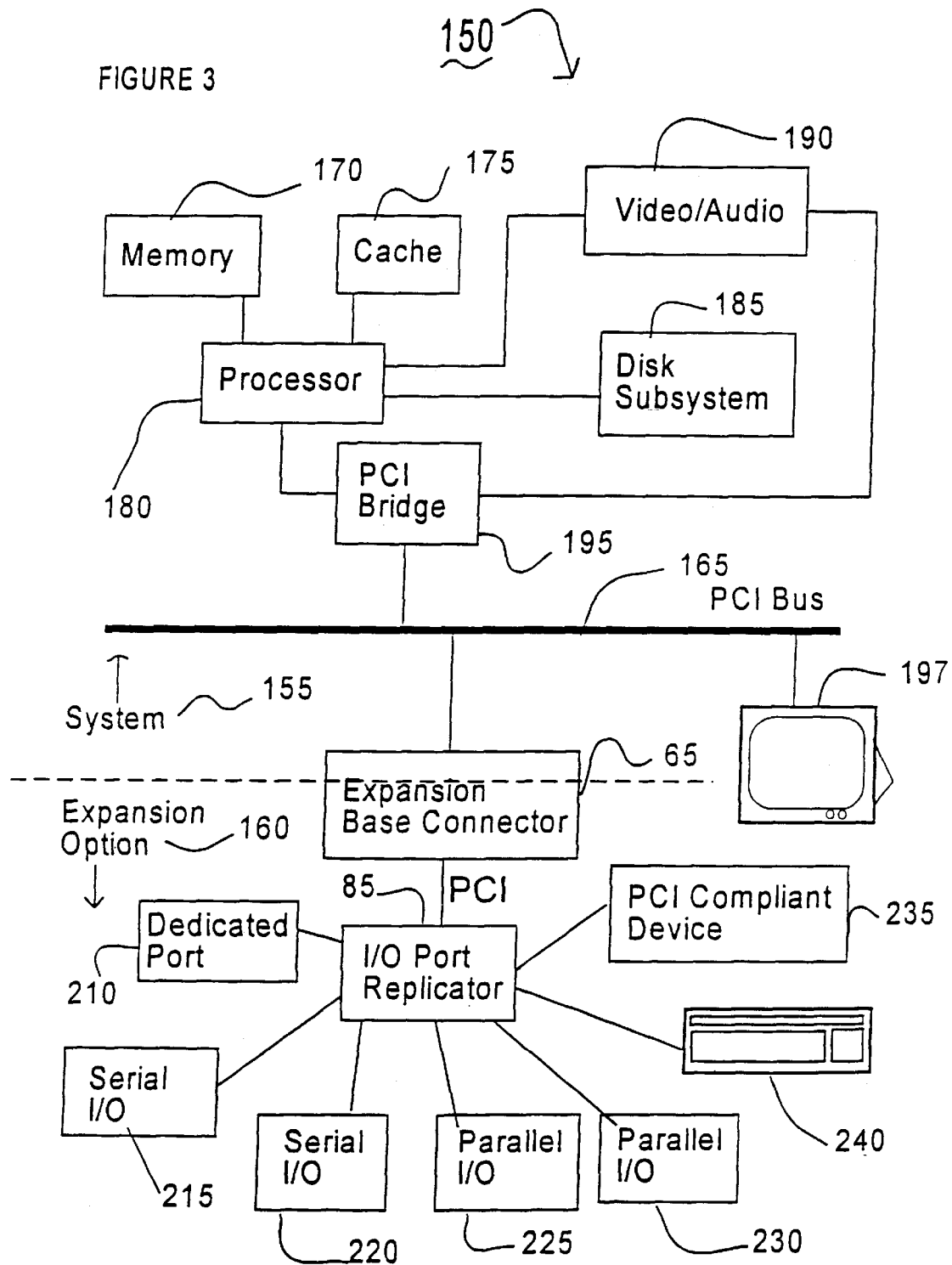
FIG. 3 is a block diagram of an expansion unit system interface in accordance with the preferred embodiment of the invention.

In reference to FIG. 3, a detailed block diagram of the overall expansion unit interface 150 in accordance with the preferred embodiment of the invention is shown. The overall expansion unit interface 150 is split into a system side 155 and an expansion option side 160. System side 155 contains all the portable computer 15 subsystems that communicate and interface with peripherals such as 110, 125, 120, 117 and 115.

A processor 180 having memory means 170 and cache 175 is shown. Disk subsystem 185 provides file storage capabilities and is communicably linked to processor 180. Also a video and audio means, such as a video/sound card or similar device, is likewise communicably linked to the processor 180.

Processor 180 and video/audio means 190 access peripheral devices through PCI bridge 195 which forms a system level interface between a manufacturer specific local bus and the PCI bus architecture 165. One or more PCI compliant devices such as display means 197 may be attached to the PCI bus 165 via a dedicated connector (not shown). Otherwise, the PCI bus is communicably linked to the expansion base connector 65 on the system side 155.

The expansion base connector 65 forms a physical level interface to option side 160 components and devices. The I/O port replicator 85 is communicably linked to the expansion base connector 65 via a plurality of pin connectors 255. One or more device protocol interfaces, indicated by numerals 210, 215, 220, 225, 230 and 235, are also provided and a pass-through protocol device 240 is supported. An example of a pass-though protocol device 240 is a keyboard 240 or serial mouse. Pin counts are low since device protocols 210, 215, 220, 225, 230 and 235 are integrated in a single chip solution on the expansion option side 160.

As shown, a dedicated port protocol 210, a first serial I/O protocol 215, a second serial I/O protocol 220, a first parallel I/O protocol 220, a second parallel protocol 230 and a PCI compliant target device protocol 235 are all supported. More or less device protocols may be used. The protocols are defined by the number of physical signal circuits or pin conductors necessary to implement a given interface standard and in the preferred embodiment 120 pins are used.

Figure 4:
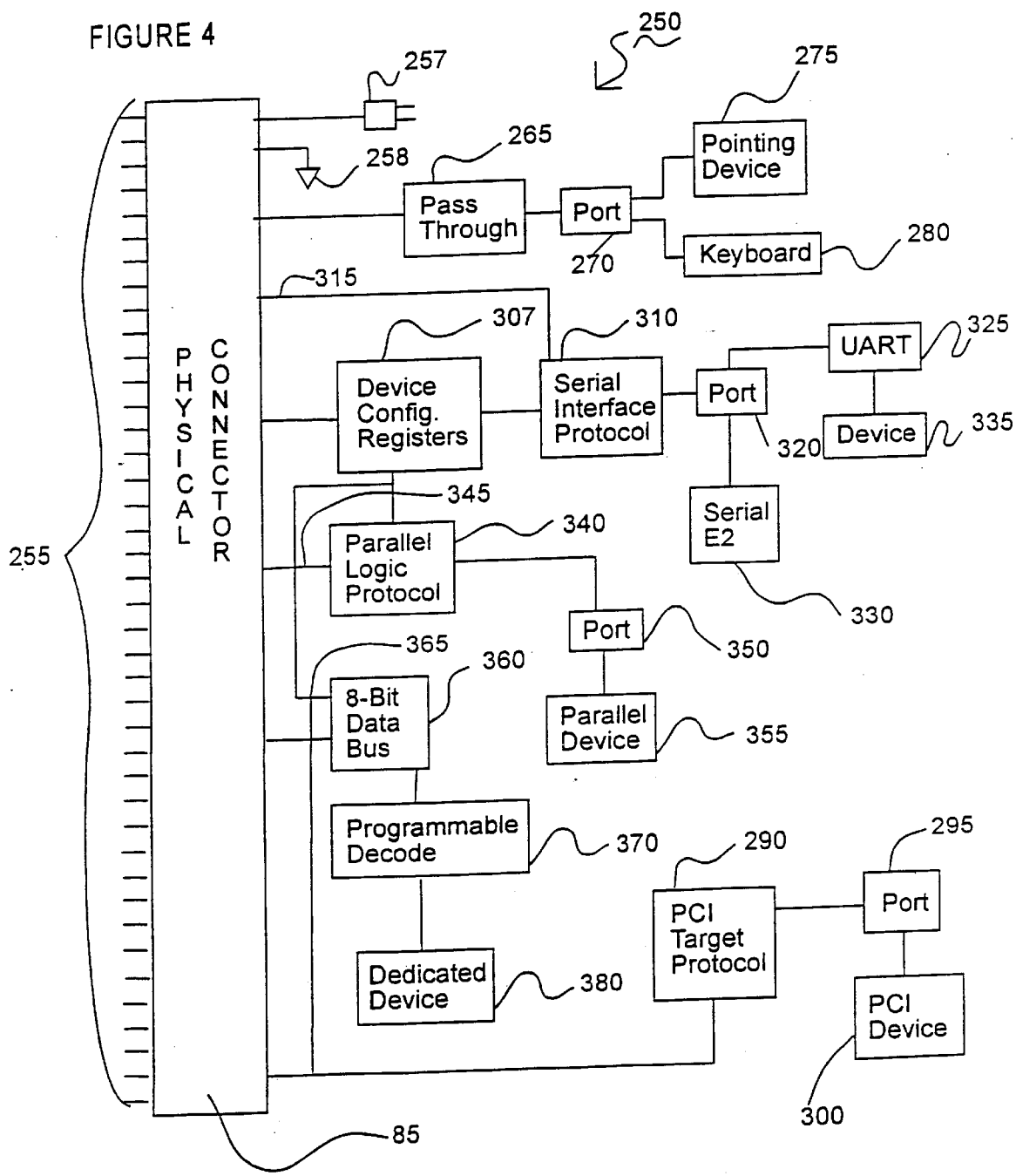
FIG. 4 is a block diagram depicting the expansion option interface in accordance with the preferred embodiment of the invention.

Turning to FIG. 4, a block diagram depicting the expansion option interface 250 is shown. The physical connection 85 to the system side 155 comprises a plurality of pin conductors 255 forming a signal pathway between portable computer system 15 components and device peripherals 275, 280, 330, 335 and 380. It should be understood that other types of connector schemes are within the scope of the invention.

Pass-through device protocols 265 are provided and communicably linked 285 to the physical connections 85 on the expansion option side 85 via dedicated pins on the connector 85. A physical connect 270 to pass-through devices 275 and 280 is provided. Physical connect 270 may comprise one or more dedicated device ports on the back of the expansion option 60 providing an interface to peripherals such as a pointing device 275 and a keyboard means 280.

In one embodiment, device configuration registers 307 are maintained on the expansion option side 160. Device configuration registers 307 are used to store protocol type and number configuration parameters which the manufacturer may define according to expansion option size and the number of protocols supported. For example, a manufacturer may wish to limit the number of protocols supported via a particular expansion option 60. Also, a manufacturer may wish to detect the presence of peripheral devices existing on the I/O port depending on where the portable computer 15 is being used. Thus, whether the portable computer 15 is being used with an expansion base 20 or an expansion option 60, the portable system BIOS can detect the presence of the peripheral devices attached via device configuration registers 307.

A PCI target protocol 290 is provided to connect 295 PCI compliant target devices 300 to the PCI bus 165. In the preferred embodiment 47 pin conductors extend from the connector 85 to the PCI device 300 directly 305 or through the configuration device registers 307. The PCI target protocol forms a communications bridge between the connector 85 and a PCI target device 300.

Serial interface protocols 310 are also provided in accordance with various defined serial protocol standards such as RS-232C, Serial $E^2$ or other recognized serial interface protocol. A serial device connector 320 provides the physical interface to a UART or similar type front end and device 335 as well as Serial $E^2$ compatible device 330. As shown Serial interface protocol 310 is communicably linked to connector 85 via a designated set of conductor pins on the option side 160 directly 315 or via device configuration registers 307 to form a communications bridge between the connector 85 and a serial device port 320.

A parallel logic protocol 340 is shown communicably linked to connector 85 via path 345 or through device configuration registers 307. The physical connect 350 to parallel communications device 355 is provided and may take the form of a parallel pin connector. Parallel logic protocol 340 is communicably linked to connector 85 via a designated set of conductor pins on the option side 160 directly 345 or indirectly via device configuration registers 307 to form a communications bridge between replicator 85 and a parallel port device 355.

A dedicated data I/O bus protocol 360 may also be employed and communicably linked to dedicated pins on replicator 85 via path 365 or through device configuration registers 307. In some embodiments, dedicated data I/O bus protocol 360 is an 8-bit or 16-bit port. A programmable decode 370 device may be used to determine the designated device recipient based on the address data bit string in the data field. The designated device 380 is communicably linked to the decode 370 and to the portable computer 15 via the replicator 85. It should be understood that data bus protocol 360 may be custom made to suit a particular manufacturer interface standard.

"Processor" in some contexts is used to mean that a microprocessor is being used on the portable system board but may also mean that a memory block (RAM, cache, DRAM, flash memory and the like) coprocessor subsystem and the like is being used. The usage herein is that terms can also be synonymous and refer to equivalent things. The phrase "circuitry" comprehends ASIC (Application Specific Integrated Circuits), PAL (Programmable Array Logic), PLA (Programmable Logic Array), decoders, memories, non-software based processors, or other circuitry, or digital computers including microprocessors and microcomputers of any architecture, or combinations thereof. Word of inclusion are to be interpreted as nonexhaustive in considering the scope of the invention.

Internal and external connections, communications links circuit or signal pathways can be ohmic, capacitive, direct or indirect, via intervening circuits or otherwise. Implementation is contemplated in discrete components or fully integrated circuits in silicon, gallium arsenide, or other electronic material families, as well as in optical-based or other technology-based forms and embodiments. It should be understood that various embodiments of the invention can employ or be embodied in hardware, software or micro coded firmware. Process diagrams are also representative of flow diagrams for micro coded and software based embodiments.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An expansion base for coupling to a portable computer, comprising:
    a connector for mating with a corresponding coupling in said portable computer, said corresponding coupling in said portable computer being connected to a PCI bus in said portable computer;
    a port replicator coupled to said connector in said expansion base;
    at least one peripheral device coupled to said port replicator; and
    said expansion base providing signal pathways between said connector and said port replicator to facilitate said portable computer polling said at least one peripheral device, updating the portable computer system BIOS to reflect the supported communications protocols, and reenumerating the expansion signal bus according to the supported communications protocols.

2. The expansion base of claim 1, wherein a peripherally coupled interface (PCI) bus couples said expansion base connector to said port replicator.

3. The expansion base of claim 1, wherein said connector for mating with a corresponding coupling in said portable computer includes all of the physical circuit paths for carrying communications signals between said portable computer and said expansion base.

4. The expansion base of claim 1, wherein said connector for mating with a corresponding coupling in said portable computer contains at least 120 pins providing support for standard I/O devices including one parallel, one serial, one PCI target device, a data port, mouse, keyboard interface and miscellaneous system signals such as power and ground.

5. The expansion base of claim 1, wherein said port replicator is implemented on a single semiconductor chip.

6. The expansion base of claim 1, wherein said port replicator acts as an agent on the PCI bus in said portable computer and as a system signal conduit from subsystems in said portable computer to peripheral devices coupled to said expansion base.

7. The expansion base of claim 1, wherein said port replicator comprises:
    a plurality of pass-through signal path ways communicably linked to a first designated set of pins in said expansion base connector;
    a first serial protocol communicably linked to a second designated set of pins in said connector; and
    a first parallel logic protocol communicably linked to a third designated set of pins in said connector.

8. The expansion base of claim 7, wherein the pass-through signal pathways, the first serial protocol and the first parallel protocol are implemented in a semiconductor chip.

9. The expansion base of claim 8, wherein:
    said plurality of pass-through signals form a communications bridge between the connector and at least one dedicated device port;
    said first serial protocol forms a communications bridge between the connector and a serial port; and
    said first parallel logic protocol forms a communications bridge between the connector and a parallel port.

10. The expansion base of claim 9, wherein said pass-through signal pathways, said first serial protocol and said first parallel protocol are implemented in a semiconductor chip device.

11. The expansion base of claim 8, further including:
    at least one dedicated data bus communicably linked to the connector; and
    a peripheral component interface protocol communicably linked to a fourth designated set of pins on the connector.

12. The expansion base of claim 11, wherein said dedicated data bus and said peripheral component interface protocol are implemented in a semiconductor chip device.

13. The expansion base of claim 9, wherein:
    a dedicated data bus forms a communications bridge between said connector and at least one dedicated device port; and
    a peripheral component interface protocol forms a communications bridge between said connector and a peripheral component interface target device port.

14. The expansion base of claim 8, further including a plurality of programmable configuration registers, said registers containing stored information regarding one or more communications protocols.

15. The expansion base of claim 9, wherein the plurality of pass-through signals support circuit pathways for a pointing device and a keyboard device.

16. A computing system supporting a PCI bus architecture and a plurality of peripheral devices, comprising:
    a) signal paths for a plurality of standard communications protocols;
    b) means for routing the signal paths to a connector within the computing device having sufficient I/O conductors to support the PCI target device standard;
    c) means for joining the signal paths to I/O conductors on the connector to form a unified expansion signal bus;
    d) means for routing the expansion signal bus to an expansion base unit communicably attached to the peripheral device components;
    e) means for polling active peripheral devices to determine the supported communications protocols;
    f) means for updating the computer device system BIOS to reflect the supported communications protocols; and
    g) means for reenumerating the expansion signal bus according to the supported communications protocols.

17. A method of minimizing signal conductor requirements between a computing device supporting a PCI bus architecture and a plurality of peripheral devices comprising the steps of:
    a) providing signal paths for a plurality of standard communications protocols;
    b) routing the signal paths to a connector within the computing device having sufficient I/O conductors to support the PCI target device standard;
    c) joining the signal paths to I/O conductors on the connector to form a unified expansion signal bus;
    d) routing the expansion signal bus to an expansion base unit communicably attached to the peripheral device components;
    e) polling active peripheral devices to determine the supported communications protocols;

f) updating the computer device system BIOS to reflect the supported communications protocols; and g) reenumerating the expansion signal bus according to the supported communications protocols.

18. The method in accordance with claim 17 wherein the step of providing signal paths for a plurality of standard communications protocols includes the steps of:

a) providing sufficient signal pathways to support a standard serial I/O interface;

b) providing sufficient signal pathways to support a standard parallel I/O interface;

c) providing sufficient pass-through signal pathways to support a keyboard signal interface; and d) providing sufficient pass-through signal pathways to support a pointing device interface.

19. The method in accordance with claim 18 further including the steps of:

a) providing sufficient signal pathways to support a second standard serial I/O interface; and b) providing sufficient signal pathways to support a second standard parallel I/O interface.

\* \* \* \* \*